United States Patent [19]

Miller, Jr. et al.

[11] 3,841,465
[45] Oct. 15, 1974

[54] SOLIDS FEED TO A PRESSURIZED REACTOR

[75] Inventors: Clarence S. Miller, Jr., Kennett Square; George A. Seely, Chadds Ford, both of Pa.

[73] Assignee: AWT Systems, Inc., Wilmington, Del.

[22] Filed: Mar. 6, 1972

[21] Appl. No.: 231,873

[52] U.S. Cl. ................ 198/213, 241/246, 241/247, 241/280, 162/18
[51] Int. Cl. ............................................ B65g 33/00
[58] Field of Search ...... 198/44, 213; 241/280, 246, 241/247; 162/17, 18, 19

[56] References Cited
UNITED STATES PATENTS

| | | | |
|---|---|---|---|
| 940,944 | 11/1909 | Shepard | 241/247 |
| 2,673,690 | 3/1954 | Segl | 162/18 |
| 3,092,338 | 6/1963 | Reinhall | 241/246 |
| 3,579,418 | 5/1971 | Ostberg | 162/18 |

FOREIGN PATENTS OR APPLICATIONS

| | | | |
|---|---|---|---|
| 364,492 | 0/1938 | Italy | 241/280 |

Primary Examiner—Richard E. Aegerter
Assistant Examiner—Joseph E. Valenza
Attorney, Agent, or Firm—Finnegan, Henderson, Farabow & Garrett

[57] ABSTRACT

A device is provided for delivering a solid feed to a reactor operating at elevated temperatures. Pressure within the reactor is controlled outside the reactor hot zone. The device has two conveyors separated by an expansion chamber. The first of the conveyors has an extrusion zone in which the solid feed is extruded into a plug which functions as a seal for the reactor. The plug is broken up in the expansion chamber with the aid of a rotating ram which is designed to seal the first conveyor in the event the extruding solid plug fails to provide the necessary seal or in the event the feed device is shut down. The second conveyor delivers the feed into the reactor.

4 Claims, 3 Drawing Figures

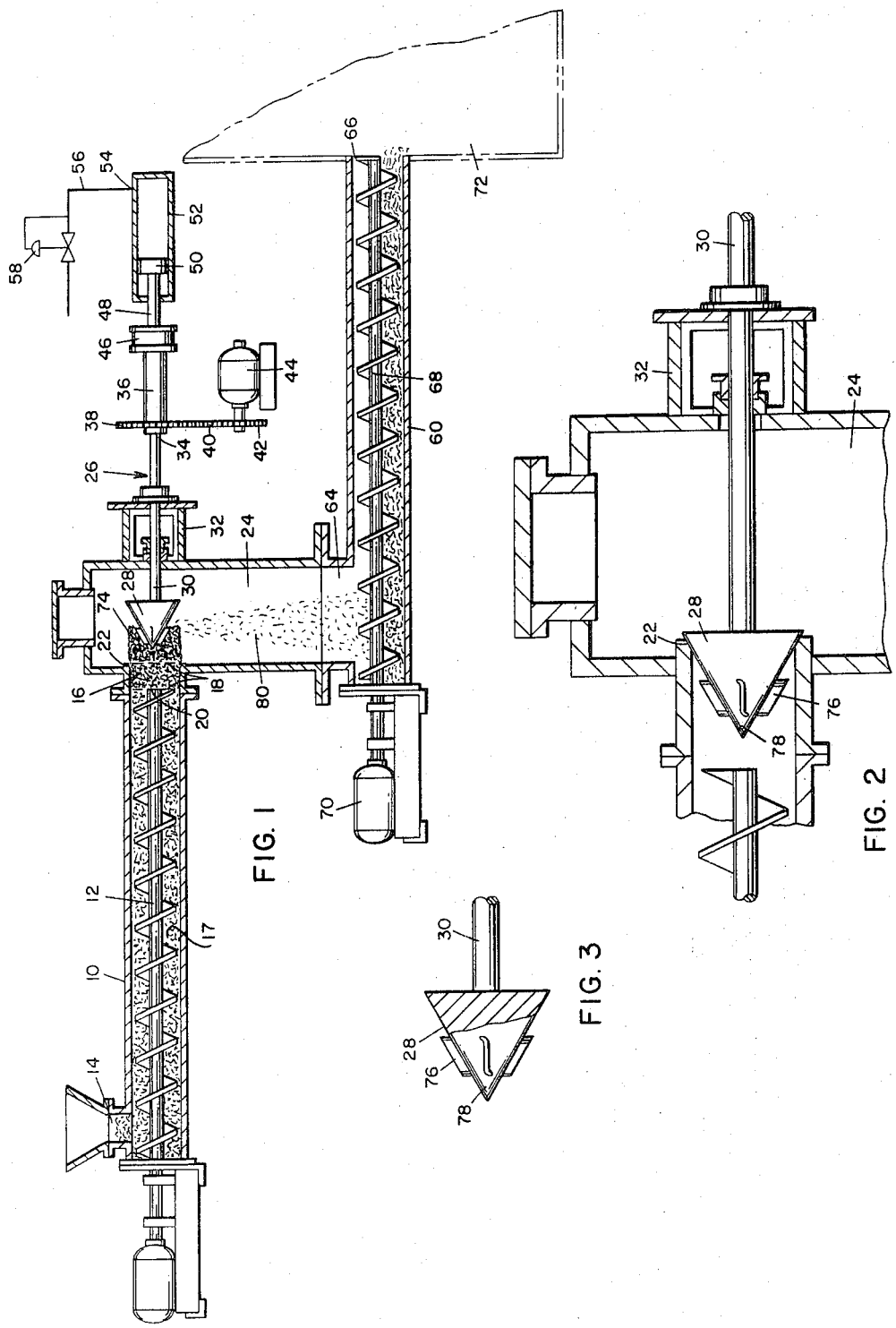

SOLIDS FEED TO A PRESSURIZED REACTOR

This invention relates to a device for delivering solid feeds to a reactor operating at an elevated temperature, say above about 500° C, and at a positive or negative pressure. More particularly, this invention relates to a solids feed device which is particularly suitable for feeding of solid waste into the bed portion of a fluidized bed type of furnace.

Fluidized bed type furnaces have been found to be particularly satisfactory for use in pyrolysis or incineration of solid wastes such as are derived from municipal and industrial waste. Such furnaces, however, operate at very high temperatures and at positive pressures. It is of the utmost importance in operation of such a furnace to be able to control the feed input to the furnace and to provide a gas seal for sealing the furnace from the feeder at a point outside of the hot zone of the furnace, and to prevent blow-back of hot gases, solid waste particles, and bed material through the feeder.

Prior art methods of feeding solids to a reactor operating at a positive pressure employed a conveyor type feeder which formed a pressure resistant compact of the solids feed to effect sealing of the feeder. The solids feed was extruded into an expansion chamber in which the compacted feed was broken up or disintegrated. The disintegrated solids in the expansion chamber fell directly into a processing zone. Solids feeders of the foregoing type are disclosed in U.S. Pat. Nos. 2,673,690; 2,698,789; and 2,829,049. Feeders of this design are not satisfactory for feeding of solid waste to a reactor operating at high temperatures, i.e., in excess of 1,000° F, and at positive pressures because the pressure control point is substantially in contact with high temperatures of the processing zone. It has also been found that suitable disintegration of the solids feed derived from solid waste cannot be achieved through simple expansion of the extruded compact of waste solids employing a solids feed device as is disclosed in the prior art. The diverse constituents in a solid waste feed charge oftentimes result in the formation of a mechanically strong compact of waste solids.

The solids feed device of this invention employs a pressure resistant compact of waste solids to function as the sealing means to maintain pressure control of the reactor during operation thereof. The solids feed device of this invention provides a pressure control point well outside the hot zone of the furnace permitting use of conventional materials of construction in the feeder seal design. The solids feed device of this invention also provides for a means to break up the pressure resistant compact of waste solids in an expansion zone.

The solids feed device of this invention is more fully illustrated in the drawings which follow. In the drawings, like numbers refer to like parts where applicable.

Of the drawings:

FIG. 1 is a longitudinal view partly in section of the solids feed device of this invention;

FIG. 2 is a partial enlarged view, partly in section, of the feed device of FIG. 1 in which the sealing means is illustrated in a sealing position; and FIG. 3 is a detail view, in section, of the ram head employed in the solids feed device of this invention.

Referring to FIG. 1, a solid waste forming tube 10 is illustrated with a screw type conveyor 12 mounted axially therein for rotation. Solid waste forming tube 10 has an inlet-end 14, a discharge-end 16, a transfer zone 17, and an extrusion zone 18. Conveyor 12 extends only to the forward end of transfer zone 17, which is the end 20 of conveyor 12, to provide for a compression and extrusion zone 18 in forming tube 10. The compression and extrusion zone 18 extends from the end 20 of conveyor screw 12 to the discharge-end 16 of forming tube 10. The walls of forming tube 10 at the discharge-end have a seat 22 formed therein. The discharge-end 16 of forming tube 10 opens into an expansion chamber 24.

A pressure actuated ram 26 is mounted externally of expansion chamber 24. The ram 26 consists of a ram head 28 and connecting rod 30 and associated seals and mechanical equipment, hereinafter briefly described, for providing both reciprocating and rotational movement along and about the longitudinal axis of the connecting rod 30 of the ram. Ram head 28 and connecting rod 30 extend into expansion chamber 24. Ram head 28 functions to break up the compacted charge of waste solids when the feed device is operating. Ram head 28 and connecting rod 30 are disposed within expansion chamber 24 so that the longitudinal axis of forming tube 10 and the longitudinal axis of ram head 28 are in axial alingment. A stuffing box 32 mounted on the exterior of expansion chamber 24 provides the means for sealing the expansion chamber 24 at the point where connecting rod 30 extends through the expansion chamber walls. The connecting rod 30 extending outside of expansion chamber 24 is splined. A sprocket gear 38 on hub 36 is connected by chain drive 40 to gear 42 which is turned by motor 44. The aft-end of connecting rod 30 is attached to a thrust bearing device 46 which in turn is attached to a second connecting rod 48 and to a piston 50. Piston 50 is mounted within cylinder 52 and is capable of reciprocating motion within cylinder 52. An air inlet 54 is placed in the base of cylinder 52. Control air is admitted to cylinder 52 through air inlet 54 by connection of air inlet 54 through line 56 and pressure control valve 58 to a pressurized air source (not shown). The air pressure employed is dependent in part on the pressure exerted against the ram by the extruding charge of solid waste.

Communicatively connected to the outlet end of expansion chamber 24 is waste conveying tube 60. Waste conveying tube 60 has an inlet-end 64, a discharge-end 66, and a second conveyor screw 68 mounted for rotation therein. Motor 70 is employed to impart rotation to conveyor screw 68. Conveyor screw 68 extends throughout the length of waste conveying tube 60 and is driven at a speed greater than conveyor screw 12 to avoid compression of the waste solids feed. The discharge-end 66 of waste conveying tube 60 terminates in an internal chamber within a fluidized bed furnace 72 (partially shown only).

The solid waste feed device illustrated in FIG. 1 is shown delivering a solid waste feed to a fluidized bed furnace. Weight metered solid waste feed is charged to the inlet-end 14 of solid waste forming tube 10. Screw conveyor 12 is rotated to convey the waste solids through transfer zone 17 and toward the discharge-end 16 of forming tube 10. As the solid waste feed passes from the end 20 of conveyor 12 it is compressed and extruded into a substantially void-free plug 74 of waste solids which is extruded from the discharge-end 16 of forming tube 10. The substantially void-free plug 74 of waste solids effects a positive pressure seal for the fluidized bed furnace 72 at a point outside the hot zone of furnace 72. Void-free plug 74 is extruded against ram head 28 within expansion chamber 24. Ram 26 is operated under pressure to cause the extruding plug 74 of waste solids to be broken up by exerting a sufficient opposing force against the plug 74 to cause the compressive strength of the plug 74 to be exceeded. It is necessary for most solid waste feeds to provide a cutting means on ram head 28 to assist in breaking up the extruding plug 74 of waste solids. A particularly suitable means to effect the necessary cutting action has been to secure cutting edges 76 on the forward-end 78 of ram head 28, and to rotate ram head 28 about the longitudinal axis thereof. Solid waste particles 80 are further broken in expansion chamber 24 as a result of the pressure release on the solid waste particles 80 as the solid waste particles 80 are cut from plug 74 and fall in expansion chamber 24 to the outlet-end thereof. The solid waste particles 80 fall into the inlet-end 64 of solid waste conveying tube 60 and are conveyed by second conveyor screw 68 to the discharge-end 66 of conveying tube 60 into the fluidized bed furnace 72.

In FIG. 2 a detailed view of ram head 28 is shown as it appears in an inoperative or closed position in which it is seated in seat 22 of forming tube 10.

Ram head 28 is illustrated in FIG. 3. The forward section 78 of ram head 28 has knife blades 76 fixedly secured to the peripheral surface of the forward section.

In operation of the feed device of this invention, ram head 28 is in an operative position such as is shown in FIG. 1. The pressure on ram 26 is regulated at a preset level or range which is satisfactory to permit both solids waste plug for sealing the furnace to be extruded from forming tube, and to permit the ram head to break-up the plug within the expansion chamber. This preset pressure is based on the physical characteristics of the solid waste feed and can be determined experimentally. In the event that during operation the solids waste feed is interrupted or stops, or the waste plug fails to function as a seal, sufficient pressure is maintained on ram head 28 to move ram head 28 against seat 22 in waste forming tube 10, thereby sealing furnace 72.

The feeding device of this invention has been particularly designed for use in feeding solid waste to a furnace operating at high temperature and a positive pressure such as a fluidized bed furnace. It is to be understood that the solids feed device of this invention is suitable to deliver all types of solids into a reactor wherein it is desirable to control pressure outside the reactor hot zone and in which the solids feed will agglomerate into a physically strong and pressure resistant plug which can be employed as a pressure seal under preferred conditions of operation. The mode of operation of the reactor has no effect on the utility of the solids feed device of this invention. Thus, the feed device of this invention can be employed to feed solids to a reactor which functions in operations such as pyrolysis, incineration, vacuum or pressure drying, and the like.

Solid waste feeds are admixtures of garbage, rags, dirt, wood, plastics, leather, rubber, water, and the like. Materials such as glass and ferrous metals are generally removed prior to feeding solid wastes to an incinerator or pyrolyzer. The composition of solid wastes varies to some degree with the season and geographical location. Solid wastes must be ground or subdivided to the extent that they can be conveyed through the solids feeder conveyor, say fragments having an average dimension of about 2 inches. The degree of subdivision required for a solid waste feed to employ in the feed device of this invention will vary from the above figure depending upon the physical size of the feed device.

In the solid feed device of this invention, the ram head is preferably tapered to the forward end of the ram, and is preferably in the shape of a cone. The ram head aids in breaking up the extruding plug of waste solids and provides a seal means for sealing the feeder. A particularly suitable shape for the ram head is a cone in which cutting blades are provided at the forward-end of the cone (apex-end) and a seal means is provided at the base-end of the cone. From the description heretofore provided, it is clear that the cutting blades on the cone must be positioned far enough forward on the tapering peripheral surface of the ram head to avoid interference of the blades with the seat of the forming tube during sealing of the furnace with the ram head.

What is claimed is:

1. A device for delivering a solid feed into a reactor operating at elevated temperatures, wherein the pressure in the reactor is controlled outside of the reactor hot zone, said device having in combination:

a. a solids feed forming tube having a transfer zone and an extrusion zone, said tube having a feed inlet-end, a feed discharge-end, and a seat at the feed discharge-end of said forming tube for receiving a seal means,
   b. a first conveyor means extending axially of said forming tube from the feed inlet-end of the forming tube to the forward-end of the transfer zone,
   c. an expansion chamber connected to and in communication with the discharge-end of the forming tube, and having an outlet-end,
   d. a reactor conveying tube having a solids feed inlet-end and a solids feed discharge-end, the inlet-end of the reactor conveying tube being connected to and in communication with the outlet-end of the expansion chamber, and the discharge-end of the reactor conveying tube being in communication with the reactor to be supplied with the solids feed,
   e. a second conveyor means extending axially through said reactor conveying tube from the inlet-end to the discharge-end thereof,
   f. drive means connected to said first and second conveyor means to impart, upon actuation thereof, rotation to said first and second conveyors,
   g. a ram having a ram head disposed within the expansion chamber in axial alignment with the solids feed forming tube, said ram having a base-end providing a seal means for engaging the seat of the forming tube, a peripheral surface tapering forward from the base-end toward a forward-end and cutting means mounted on the peripheral surface of the ram head for breaking up feed of solids discharged from the forming tube, said cutting means being located to avoid interference with the seat of the forming tube,
   h. drive means for imparting rotation to said ram head about its axis, and
   i. drive means for biasing the ram head into engagement with the seat of the solids forming tube to effect a sealing thereof and capable of permitting reciprocal movement of the ram head away from sealing engagement when opposed by pressures from the discharged feed above a pre-established pressure level.

2. The device of claim 1, in which the second conveyor means rotates at a speed greater than said first conveyor means.

3. The device of claim 1 in which the ram head is cone shaped.

4. The device of claim 1 in which the first and second conveyor means are screw type conveyors.

* * * * *